Jan. 5, 1960   C. F. MONTROSS ET AL   2,920,088
CONTINUOUS METHOD FOR THE MANUFACTURE OF SOLID ESTERS
Filed Nov. 8, 1956
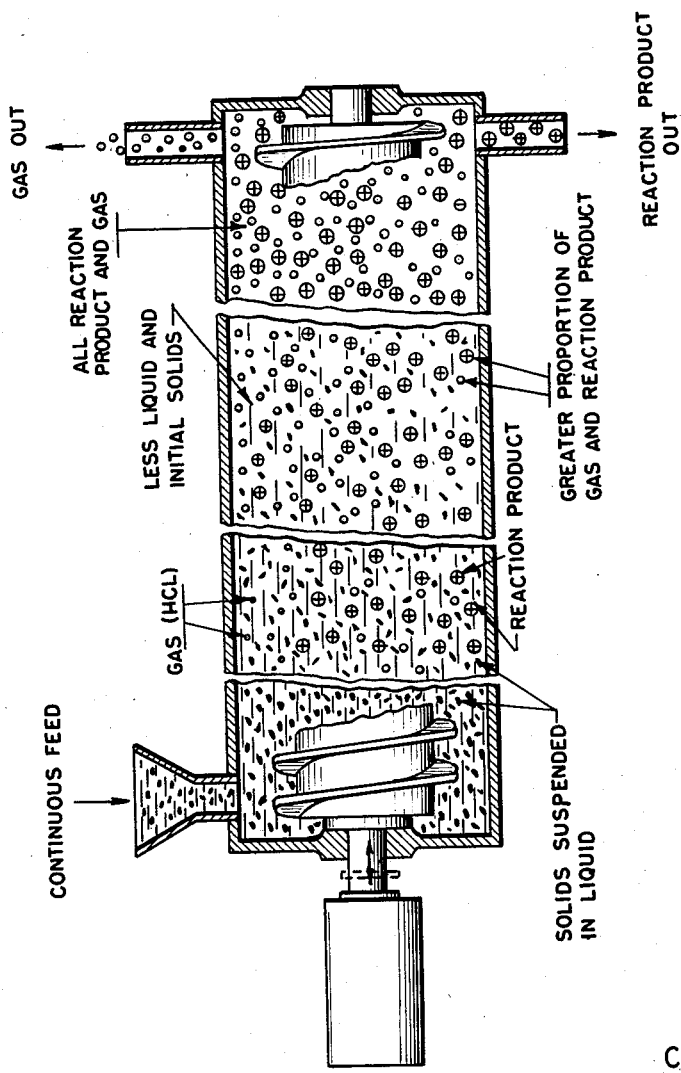
INVENTORS
Charles F. Montross
BY  Fred E. Woodward
Fritz Wuerth
ATTORNEY

United States Patent Office 2,920,088
Patented Jan. 5, 1960

2,920,088

CONTINUOUS METHOD FOR THE MANUFACTURE OF SOLID ESTERS

Charles F. Montross, Union, Fred E. Woodward, Scotch Plains, and Fritz Wuerth, Elizabeth, N.J., assignors to General Aniline & Film Corporation, New York, N.Y., a corporation of Delaware Application November 8, 1956, Serial No. 621,010

6 Claims. (Cl. 260—410.9)

This invention relates to a new process for preparing esters and in particular normally solid esters in a continuous manner in a finely divided form and in an exceptional state of purity.

There are innumerable techniques and processes available in the chemical arts for preparing various types of esters. In the preparation of those esters which are solid at or considerably above room temperature, the problems are a bit more complicated, usually requiring in the preparation thereof a diluent or solvent so as not to create a setup of the material in the reaction vessel. Such processes are usually of the batch type reaction. Others of the batch type are known to employ powerful agitating means to maintain the solid material in a relatively fine state of subdivision whereby setup is partially eliminated. All of these prior art processes, however, are quite deficient in the purity of the product obtainable thereby and in many instances, too, this quality is reduced not only by the failure of the reaction to go to 100% completion but by the byproducts of the esterification reaction. In those processes where an acid halide is employed to react with an alcohol, there may be considerable hydrochloric acid and/or sodium chloride left in the reaction mass, which is undesirable in most cases.

The present process provides a technique for reacting fatty acid halides with alcohol salts whereby the resultant solid ester is obtained in practically quantitative yields without any contaminating byproducts such as sodium chloride and the like.

It is therefore an object of this present invention to provide a process whereby fatty acid halides and salts of hydroxy-containing compounds one of which is normally a solid are reacted to give solid esters in a high state of purity and in practically quantitative yields.

It is a further object of this invention to provide a process whereby fatty acid halides and salts of hydroxyl-containing carboxylic and sulfonic acids one of which is a solid are reacted in a continuous manner to give the desired solid ester in a finely divided form in a high state of purity and in substantially quantitative yields.

It is a still further object of this invention to provide a process whereby a fatty acid halide and a salt of the aforementioned type one of the said reactants being normally a solid are reacted in a continuous manner in a fluidized state to give the corresponding ester thereof in a finely divided form and in a high state of purity.

Other objects will appear hereinafter as the description proceeds.

The objects of this invention are achieved by carrying out the reaction of a fatty acid halide and the salt of an aliphatic alcohol, aromatic alcohol or phenolic compounds, one of which reactants and usually the salt is normally in a solid state, in a closed reaction vessel. Usually, and preferably, the fatty acid halide is a liquid and the alcohol is a solid under the conditions in the reaction vessel. The volume of the reactants is maintained at all times substantially equivalent to the total internal volume of the aforementioned reaction vessel. The gases which are liberated as a result of the esterification reaction are maintained in the system and the action of said gases is to transform the entire mass within said vessel into a fluidized state. Since as the reaction proceeds between the (in the preferred technique) liquid fatty acid halide and the solid alcohol there is obtained a solid ester and a hydrogen halide, it is primarily the reaction products which are thus maintained in a fluidized state and particularly the solid ester which is so maintained by the evolved gases formed during the esterification reaction. It is also necessary in order to obtain efficient interaction between the fatty acid halide and the solid alcohol to maintain the initial reaction mass in a constant state of violent agitation. As the reaction proceeds and more and more ester is formed and concurrently therewith more and more gas, the need for the agitation is lessened since the fluidizing effect of the hydrogen halide in the closed system comes into play. As a result of such fluidizing action the equilibrium of the reaction is made to shift completely toward the formation of ester due to the intimate contact made possible by this technique between the insoluble hydroxyl containing reactant and the acid halide, thereby giving an exceptionally high yield of product. At the same time the thusly prepared ester while in the form of a finely divided solid, nevertheless, in the system, is in its physical action very much like a liquid because of the small particle suspension. It is thus capable of flowing and because of this property, is readily separable from the hydrogen halide at the conclusion of the processing. By so carrying out the present process it is possible to obtain the solid ester in a finely divided readily flowable form which does not need any further treatment such as drying, grinding, purifying and the like.

One of the preferred ways of carrying out the present process involves the employment of an elongated cylindrical reaction vessel into one end of which is fed a slurry of a liquid fatty acid halide and a solid alcohol salt which is insoluble in the liquid phase. The temperature of the system is preferably maintained at just below the threshold reaction temperature necessary for the desired esterification to occur. This temperature may vary from subzero temperatures with certain reactants to as high as 140° C. with others. In order to obtain efficient agitation it is preferred to employ some mechanical means which give a combination of shearing and/or tumbling action. Such machines are readily available in the chemical processing field and are usually characterized by either an oscillating rotary motion, a translatory motion or a combination of these or some other equivalent mechanisms whereby the desired degree of efficient agitation is attained. Examples of such equipment are the Ko-Kneader, Holo-Flite, Votator and miscellaneous mullers. After the reactants are introduced into the reaction vessel, and following a latent period, esterification begins and hydrogen halide is evolved. As the reaction proceeds the liquid phase as represented by the fatty acid halide (in the usual and preferred form) diminishes and the gas phase (the hydrogen halide) increases in concentration. The solid phase also increases in volume in comparison to the amount of the solid alcohol originally present. During the initial stages of the esterification reaction where there has been little hydrogen halide formed, the action of the agitating means contributes greatly towards efficient esterification but as more ester is formed the agitation by these mechanical means becomes less and less efficacious. At this point, however, the evolved hydrogen halide by virtue of its being whipped into the reaction mass by the aforementioned mechanical means, acts as a fluidizing force to give to the mass in the vessel the appearance of a flowing liquid. In effect, then, the gas is maintaining the mass in a fluidized state. In this state, reaction may then proceed to full completion as described above and that is towards the formation of solid ester and gaseous hydrogen halide. Because of the presence of the latter also as pointed out above, the solid ester thusly prepared is in a fine state of comminution and may readily be separated from the gas at the exit end of the reaction cylinder. In the accompanying drawing the above described action is pictorially represented, wherein a conventional reaction vessel containing means for mixing the reactants is shown. The continuous feed is introduced through a suitable opening at one end of the vessel, said feed comprising the slurry of solid alcohol salt suspended (i.e., insoluble) in the liquid fatty acid halide. As interaction proceeds under the influence of the selected temperature, solid reaction product and gas are formed in increasing amounts as there is a corresponding diminution of feed material concentration until at the exit end of the reaction vessel there is, as shown, solid reaction product and gas in a readily separable condition. Since the separation of the solid ester from the hydrogen halide may not be expected to be 100% efficient, it may be desirable before the exiting of the solid ester to meter in a small amount of alkali such as caustic soda to neutralize any residual gas which may be entrapped or absorbed in or on the solid ester. Where minute quantities of halide salts are not undesirable, this is the simplest technique to employ. Otherwise neutralization can be eliminated and vacuum employed instead at this point whereby it is possible to completely remove the hydrogen halide due to the finely divided state of the product. Said residual hydrogen halide can also be removed as a later processing step in a variety of obvious and simple ways as, for example, by spreading the solid ester on large open pans and permitting the gases to completely dissipate.

The fatty acid halides which are contemplated in the present invention are those whose formula may be represented as follows:

$$R_1COX$$

wherein $R_1$ represents an aliphatic chain and usually a hydrocarbon chain of from 7 to 17 carbon atoms and X represents a halogen atom, usually and preferably chlorine. The solid alcohols which are contemplated for use in this invention have the following structural formula:

$$HO[R_2]AM$$

wherein $R_2$ represents an aliphatic or aromatic radical and preferably an alkylene chain of from 2 to 6 carbon atoms, A represents an acid radical such as sulfonic acid and carboxylic acid, and M represents a cation such as sodium, potassium, lithium or ammonium.

The esterification reaction between the two types of compounds described above involves the elimination of a chlorine atom from the fatty acid halide and the hydrogen atom from the hydroxyl group of the solid alcohol giving rise to a salt (as represented by the action M) of the ester which compound may be depicted as having the following structural formula:

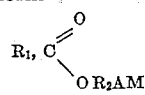

wherein $R_1$, $R_2$, A and M have the meanings described above.

The following acid halides exemplify those which may be employed in the processes of the present invention:

Octanoyl chloride
Nonanoyl chloride
Decanoyl chloride
Lauroyl chloride
Myristoyl chloride
Palmitoyl chloride
Stearoyl chloride
and the like.

Included within the group of alcohols or hydroxyl-containing compounds which may be employed in this invention are the following:

Sodium isethionate
Sodium glycollate
Sodium α-hydroxy propionate
Sodium β-hydroxy propionate
Hydroxy propane sulfonates (sodium, potassium, etc.)
Sodium, 1-hydroxy, 1-butane sulfonate
Sodium, 3-hydroxy, 3-methyl butane sulfonate
Sodium, 2-hydroxy, 2-methyl, 1-propane sulfonate
Sodium, β-(p-hydroxy phenyl) propionate
Sodium, 2-hydroxy, 3-phenyl, 1-propane sulfonate
Sodium, 2-hydroxy, 2-phenyl, ethane sulfonate
o-Phenol sulfonates (sodium, potassium, etc.)
m-Phenol sulfonates (sodium, potassium, etc.)
p-Phenol sulfonates (sodium, potassium, etc.)
4-propyl, 1-phenol-2 sulfonate (sodium), and the like.

The following examples will serve to illustrate the invention without being deemed limitative thereof.

*Example 1*

Into an elongated cylinder having a diameter of about 20 in. and an overall length of about 10 ft. in which there is mounted a rotating helical member which is also capable of some oscillatory (back and forth) motion, there is introduced a slurry comprising an equimolecular mixture of lauroyl chloride and sodium isethionate. The temperature within the reaction vessel is maintained at 125° C. The entire reaction vessel is filled with the slurry and the machine is then placed into operation, that is, the agitating and grinding means are started. Since the reactants at the exit end of the cylinder have not traversed the length of the cylinder under reaction conditions, obviously then such material is not ready to be withdrawn, at the time the machine is put into operation, as the desired ester product. By virtue of the exceptionally high efficiency of the present process, complete esterification is usually accomplished at the threshold reaction temperatures in about one-fourth to one-twentieth of the time usually necessary in batch type operation. With the two reactants employed in this example, a batch operation normally takes from 1 to 2 hours for completion. By the present process esterification is completed in about 5 to 20 minutes. Therefore, after the process has been put into operation, after 20 minutes there may be withdrawn at the exit end of the reaction vessel, completely esterified finely comminuted dry ester and the process continued in operation with equivalent amounts of acid halide and solid alcohol metered into the reaction vessel at a rate to maintain the volume of reactants substantially equal to the internal volume of the reaction vessel. Adjacent the exit port through which the solid ester is withdrawn and preferably at the top of the cylinder, a port is provided for releasing the gaseous halides so as not to build up too great a pressure within the reaction vessel and at the same time, of course, to provide for adequate separation of the solid ester from the gas. Also, adjacent to the exit port for the solid ester, means are provided for adding suitable quantities of alkali material to adjust, if desired, or eliminate if necessary any residual acidity due as described above to possible entrapped acidic gases. After 20 minutes or operation, solid, comminuted sodium lauroyl isethionate of 95% purity is withdrawn from the exit port of the reaction cylinder.

*Example 2*

A process as described in Example 1 is put into operation employing equimolar amounts of the same compounds described in that example. In this run it is desired that the acidity as HCl be substantially less than 1%. After 20 minutes the gas exit port and the solid exit port are opened. The resultant HCl from the gas port is taken off and may be used for other purposes, such as for the manufacture of hydrochloric acid solution after proper treatment. The solids which are recovered are in a fine state of subdivision, dry, and when tested show an acidity of less 1% HCl. Suitable solid reaction product continues to flow from the exit port continuously at a rate equivalent to the rate at which the fatty acid halide and the sodium isethionate are supplied to the reaction cylinder.

*Example 3*

The process of Example 2 is repeated employing palmitoyl chloride and sodium 1-hydroxy-1-butane sulfonate. An outstandingly pure, finely comminuted palmitoyl ester is obtained.

*Example 4*

The process of Example 2 is repeated employing stearoyl chloride and sodium β[p-hydroxy phenyl] propionate. Again a pure yield of finely divided ester is obtained when the residence time for reaction is 30 minutes instead of 20 minutes as in Example 2.

*Example 5*

The process of Example 2 is repeated using the monosodium salt of p-phenol sulfonic acid and octanoyl chloride. Residence time for the reactants is 40 minutes and the temperature of reaction is maintained at 140° C. An excellent yield of the phenol ester in a high state of purity is obtained.

While there has been illustrated and also exemplified specific acid chlorides which are operative in the instant invention, it is of course clear that other acid chlorides and substituted fatty acid chlorides may be employed where the substituent is inert in so far as the desired esterification reaction is concerned. In addition to those hydroxy-containing compounds which have been illustrated and exemplified, others may be employed, and it is within the contemplation of this invention to employ liquid hydroxy-containing compounds where the acid chloride is in a solid state at the reaction temperature. The only factor which must be borne in mind is that the acid chloride and the hydroxy-containing compound must be so selected that one is a solid and the other a liquid, and the solid should be insoluble in the liquid phase at the temperatures employed in the reaction vessel so as to maintain at all times a distinct two-phase system. It is also necessary in the selection of the reactants that the resultant ester also be a solid insoluble in the acid chloride so that it too maintains its distinct solid physical state throughout the reaction.

We claim:

1. A continuous method for the preparation of solid esters from fatty acid halide said halide selected from the group consisting of fatty acid chlorides and fatty acid bromides and an organo hydroxy-containing compound with which said fatty acid halide reacts to form an ester one of the reactants being normally a solid, which comprises introducing a mixture of said halide and said hydroxy compound into a closed vessel at a temperature sufficient for the esterification reaction to occur, the volume of said mixture being substantially equal to the volume of said closed vessel, maintaining said mixture at the said volume of said closed vessel, maintaining said mixture at the said volume with constant agitation and under the pressure of the hydrogen halide gas evolved in the reaction, the said evolved gas and the said agitation together acting to maintain the said mixture and the resultant solid ester in a fluidized state whereby completion of the esterification is facilitated, and then isolating the solid ester.

2. A method as defined in claim 1 wherein the mixture of fatty acid halide and alcohol comprises equimolar amounts of each of the said ingredients.

3. A process as defined in claim 2 wherein the fatty acid halide is liquid lauroyl chloride, the hydroxy compound is solid sodium isethionate and the temperature of the reaction is 140° C.

4. A method as defined in claim 1 wherein the agitation is a combination of grinding and translatory motions.

5. A method as defined in claim 3 wherein the agitation is a combination of grinding and rotating translatory motions.

6. A continuous method for the preparation of solid ester from fatty acid halide said halide selected from the group consisting of fatty acid chlorides and fatty acid bromides and an organo hydroxy-containing compound with which said fatty acid halide reacts to form an ester one of the reactants being normally a solid insoluble in the other compound, which comprises introducing a mixture of said halide and said hydroxy compound into a closed vessel at a temperature sufficient for the esterification reaction to occur, the volume of said mixture being substantially equal to the volume of said closed vessel, maintaining said mixture at the said volume of said closed vessel, maintaining said mixture at the said volume with constant agitation and under the pressure of the hydrogen halide gas evolved in the reaction, the said evolved gas and the said agitation together acting to maintain the said mixture and the resultant solid ester in a fluidized state whereby completion of the esterification is facilitated, and then isolating the solid ester.

References Cited in the file of this patent

UNITED STATES PATENTS

| 1,916,766 | Steindorff et al. | July 4, 1933 |
| 2,821,535 | Britton et al. | Jan. 28, 1958 |

FOREIGN PATENTS

| 151,318 | Switzerland | Mar. 1, 1932 |
| 1,007,214 | France | May 5, 1952 |

UNITED STATES PATENT OFFICE
CERTIFICATION OF CORRECTION

Patent No. 2,920,088                                        January 5, 1960

Charles F. Montross et al.

It is hereby certified that error appears in the above numbered patent requiring correction and that the said Letters Patent should read as corrected below.

Column 4, between lines 8 and 9, insert -- Sodium salicylate --; line 58, for "minutes or" read -- minutes of --.

Signed and sealed this 13th day of June 1961.

(SEAL)
Attest:

ERNEST W. SWIDER
Attesting Officer

DAVID L. LADD
Commissioner of Patents